United States Patent [19]

Weissman et al.

[11] 4,153,011
[45] May 8, 1979

[54] WATER TROUGH ATTACHMENT FOR A HORSE TRAILER

[76] Inventors: Richard Weissman, 135 Clinton St., Hempstead, N.Y. 11550; Christian H. Haack, 221 Richard Ave., Merrick, N.Y. 11566; Michael W. Fried, 227-16 Hillside Ave., Queens Village, N.Y. 11427

[21] Appl. No.: 842,611

[22] Filed: Oct. 17, 1977

[51] Int. Cl.² .............................................. A01K 7/00
[52] U.S. Cl. ........................................ 119/72; 119/78
[58] Field of Search .................... 119/72, 73, 74, 77, 119/78, 10, 7; 280/5 R, 769; 224/42.32, 29 R, 42.45 R; 248/313, 314, 311.1R, 223.4

[56] References Cited

U.S. PATENT DOCUMENTS

| 1,108,151 | 8/1914 | Eaton | 119/77 |
| 1,643,245 | 9/1927 | Jevons | 119/73 |
| 2,926,879 | 3/1960 | Dietrich | 224/42.45 R |
| 3,014,684 | 12/1961 | Gould, Jr. | 248/313 |

*Primary Examiner*—Hugh R. Chamblee
*Attorney, Agent, or Firm*—Bauer & Amer

[57] ABSTRACT

A water trough and storage tank for same that are readily attached externally to the vertical wall of a horse trailer with significant attendant benefits, including obviating the time and effort to carry buckets from faucet to trailer at the show grounds or other such site in order to supply the requirements of the transported horses. To achieve the aforesaid practical benefits, a tank of twenty gallons capacity is dictated, and the attachment and transport thereof is accomplished without damage to the trailer by a sliding connection of the tank to the trailer wherein slight vertical movements in the tank, due to road unevenness or the like, will occur wihout straining or stressing the trailer support wall.

4 Claims, 8 Drawing Figures

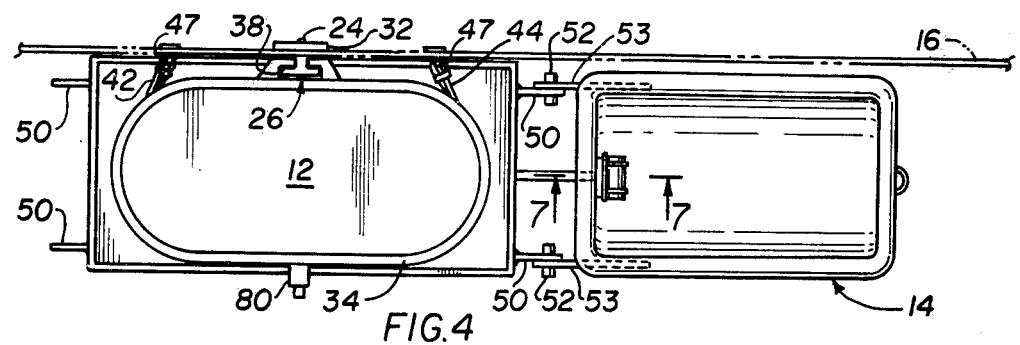
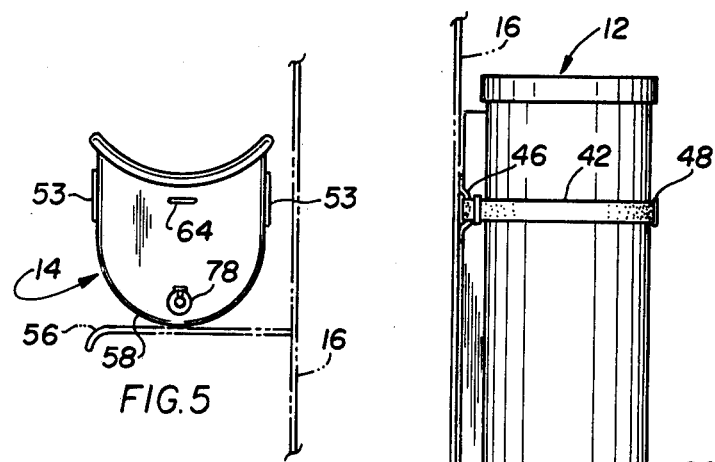
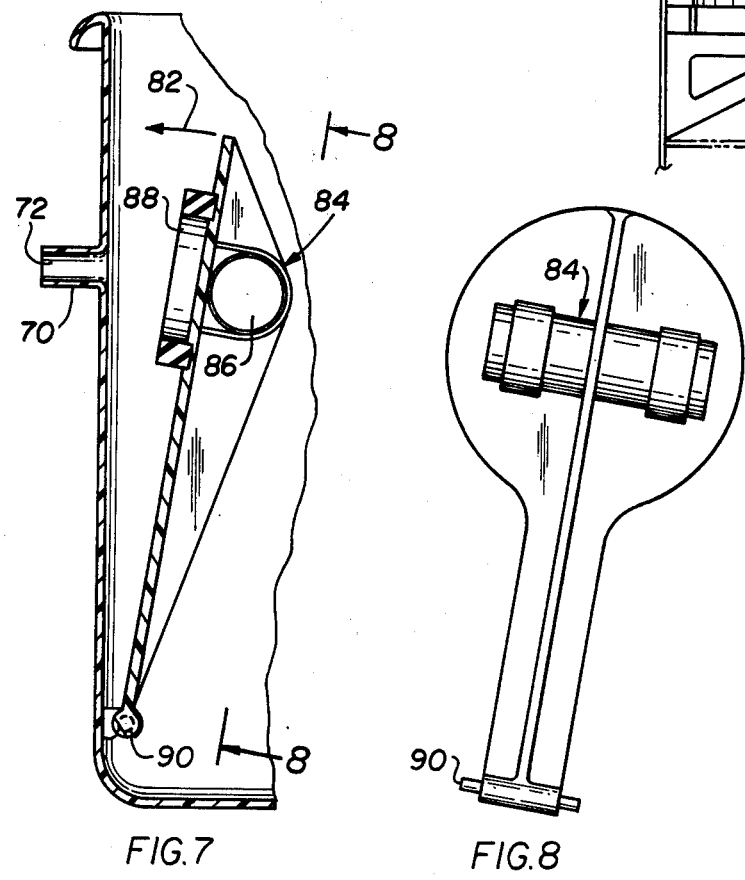
FIG.4
FIG.5
FIG.6
FIG.7
FIG.8

WATER TROUGH ATTACHMENT FOR A HORSE TRAILER

The present invention relates generally to improvements for a horse trailer, the improvements more particularly residing in a self contained water supply for the trailer.

As understood, a day's quantity of water for two show horses is typically twenty gallons, and is thus a quantity of water which because of its weight and difficulty in handling during transit, particularly over rough roads or terrain, is not a cargo that can readily be transported by currently available horse trailers. A further complication is that the size of this capacity water storage tank contributes to a wind resistance problem that also must be contended with in any water supply system that is externally attached or supported on the horse trailer. In this regard, for obvious reasons, an external position of the watering system on the trailer is almost essential because of its need to be accessbile to the horses at the site of use.

Broadly, it is an object of the present invention to provide an improved horse trailer overcoming the foregoing and other shortcomings of the prior art. Specifically, the horse trailer hereof has an external, self contained water storage tank and trough which is readily attached and advantageously used at remote sites, without subjecting the horse trailer, despite the additional weight and forces which it imposes thereon, to any possibility of damage.

A water trough attachment for a horse trailer demonstrating objects and advantages of the present invention includes a trailer-attached support bracket having a T-shape in cross-section. A water tank having a cooperating shaped attachment bracket extending rearwardly therefrom is adapted to be slidably disposed over said T-shaped support bracket, and in this way the water tank is effectively supported on the horse trailer. Connected to receive water, on demand, from the tank is a water trough that is hingedly connected adjacent one side of the water tank so as to be pivotally traversable between a horizontally oriented position during use and a vertically oriented storage position adjacent the water tank. In a preferred embodiment, the water trough has a convexly curved bottom, and thus presents a correspondingly curved surface with an optimum nominal wind resistance in its previously noted storage position, a position it occupies when the horse trailer is in transit and there is thus a need to prevent wind resistance from straining the connection holding the water tank and trough to the trailer.

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein:

FIG. 4 is a plan view projected from FIG. 2 showing further structural features;

Figures 2, 3:
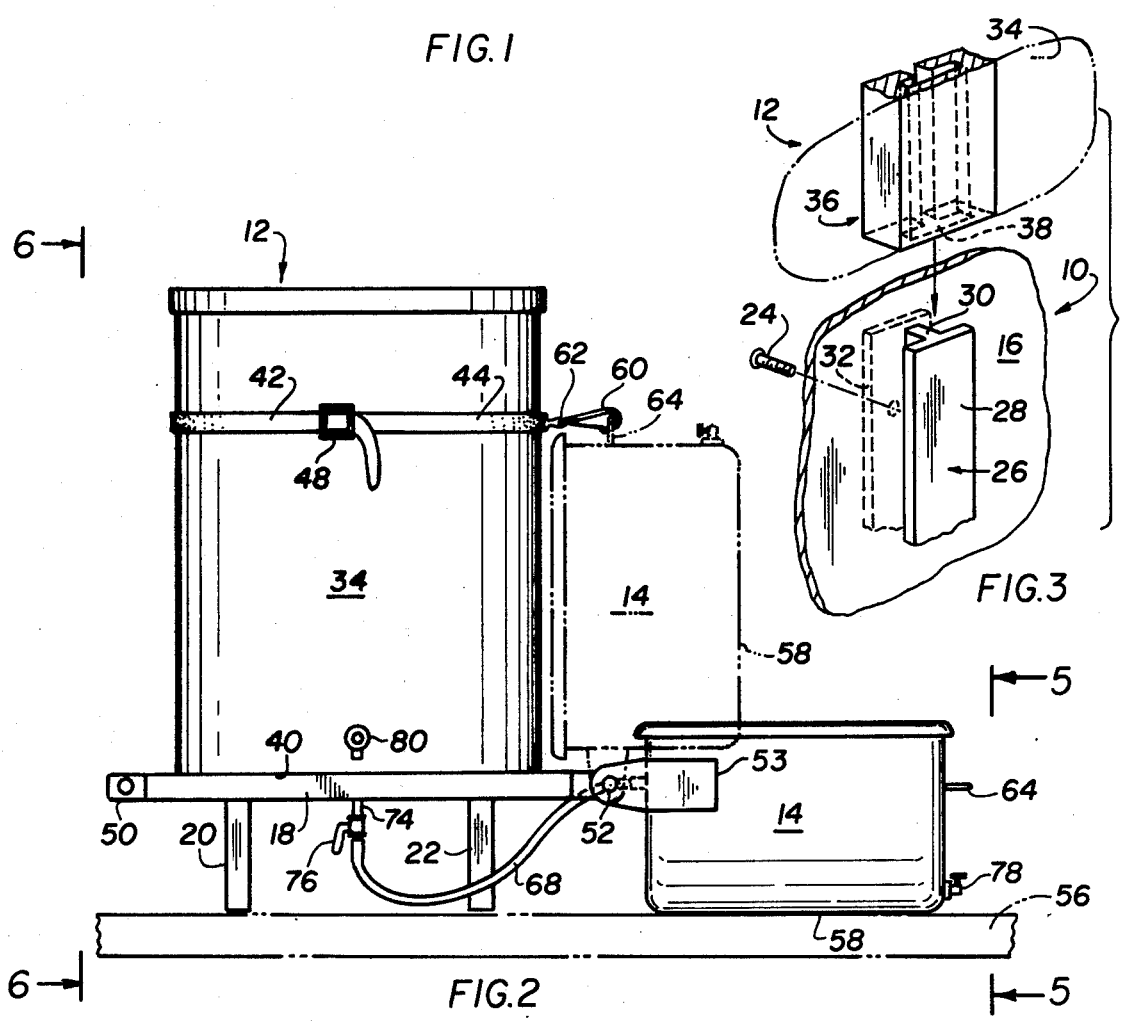
FIG. 2 is a partial side elevational view, on an enlarged scale, of only said combination water tank and trough of FIG. 1, in which details of the structural features embodied by these components are better illustrated.
FIG. 3 is a partial perspective view illustrating details of the sliding connection which is utilized in accordance with the present invention of attaching the water tank to the horse trailer.

FIGS. 5 and 6 are side elevational views of the water tank and water trough as seen from opposite sides of FIG. 2 in the direction of the arrows 5—5 and 6—6 respectively;

FIG. 7 is a partial side elevational view, in section taken along lines 7—7 of FIG. 4, of a flotation closure member for controlling the water level in the water trough; and FIG. 8 is a detailed view of said flotation closure member as seen in the direction of the arrows 8—8 of FIG. 7 showing further structural details.

Figure 1:
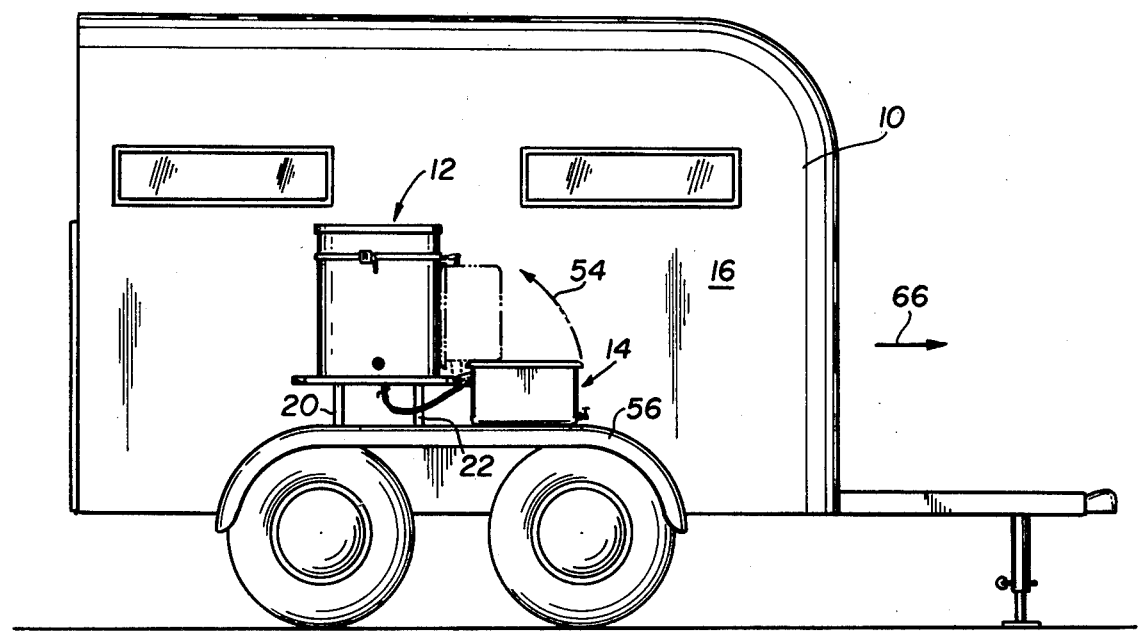
FIG. 1 is a side elevational view illustrating a combination water tank and trough in its attached relation to a horse trailer, the positions of movement of said water trough being illustrated in full line and in phantom line perspective.

Reference is made to the drawings, and in particular to FIG. 1 which illustrates a typical horse trailer 10 of the type adapted to be hitched to a car or other vehicle and to transport horses to fairs, show grounds, or other locations remote from the location where the horses are normally maintained. As illustrated in FIG. 1, supported externally on the trailer 10 is a water tank, generally designated 12, having a cooperating water trough, also generally designated 14, which is movable from a vertically oriented storage position adjacent tank 12, as illustrated in phantom perspective, into an operative horizontally oriented position, as illustrated in full line, during which it is conveniently used to supply the drinking needs of two horses understood to be transported in the trialer 10. The noteworthy structural features of the tank 12 and trough 14, as well as the facilitated manner in which these are mounted or supported on the trailer 10, are set forth in, and will be clearly understood from, the description which follows. At this point, however, it is helpful to take note of the significant advantages that accrue from providing the horse trailer 10 with its own water supply. These advantages include relieving the owner of any concern about the availability of water at the show grounds or other location to which the horses are being transported, the significant savings in time and effort of the owner, assuming the availability of water, of carrying buckets thereof from the faucet location to the trailer and, of course, the avoidance of spillage and waste which unavoidably results when such buckets of water have to be carried when setting up the horse trailer at the fair or show grounds and the like.

The practical requirements for a water tank 12 to satisfy the typical requirements of two show horses dictate a size that provides a storage capacity, when full, of approximately twenty gallons. The trough 14 cooperating with such a tank should have a capacity of approximately six gallons. Thus, it should be readily appreciated that when tank 12 is filled with twenty gallons of water, that the same represents a significant weight which requires appropriate handling when the trailer 10 is in transit in order to avoid damage to the trailer, particularly if the road conditions and terrain are not ideal. In recognition of this, it is accordingly proposed that the water tank 12 be supported on a vertical side wall 16 of trailer 10 via a sliding connection thereto in conjunction with the bottom of said tank resting on a rectangular platform 18 that is appropriately supported laterally of the wall 16 by a pair of support brackets 20, 22. More particularly, and as is best illustrated in FIGS. 3 and 4, bolted externally of the wall 16, as by bolts 24, is a support bracket, generally designated 26, which bracket in cross-section has a T-shape provided by perpendicularly oriented legs 28 and 30. One preferred manner of mounting the bracket 26 to the wall 16 is to project the bolts 24 through openings in the wall 16 into threaded engagement in threaded bores provided in the leg 30. A mounting plate 32 positioned along the inside of the trailer wall 16 contributes rigidity to the manner in which bracket 26 is held in its supported position on the wall 16.

Appropriately connected, as by welding or the like to extend rearwardly of the cylindrical housing 34 of the tank 12, is a connecting bracket, generally designated 36, which is appropriately machined, as clearly illustrated in FIGS. 3, 4, with a cooperating T-shaped opening 38 therealong which permits a sliding interconnection to be made between the brackets 36 and 26, and thus results in an effective attachment of the tank 12 to the trailer wall 16. More particularly, tank 12 is slidably disposed on the T-shaped bracket 26 until the bottom wall 40 thereof comes into supported contact with the previously noted platform 18. Other than resting upon the platform 18, there is no need for any additional connection since the weight of the twenty gallons being transported in the tank 12 is more than sufficient to maintain the tank 12 in its supported position on the platform 18 and adjacent the trailer wall 16. Nevertheless, to assit in maintaining the position of the tank 12, while at the same time allowing for slight vertical movement in said tank as will occur due to road uneveness during movement of the trailer 10, and thus to prevent this tendency to movement from imposing an undue strain and stress on the trailer wall 16 which could result in damage to this wall, use is made of flexible straps 42 and 44 to supplement the connection of the tank 12 to the trailer 10.

As shown in FIG. 6 in conjunction with FIG. 4, metal fixtures which present a closed loop 46 are appropriately mounted on trailer wall 16 and each of said previously noted strap lengths 42 and 44 are looped at one end, as at 47, about a cooperating metal loop 46 so that the opposite or free ends of these straps can be buckled together, as at 48.

Turning now to a preferred manner of physically interconnecting the trough 14 with the tank 12, this can be done using either one or another of a pair of lugs 50 which extend from opposite ends of the support panel 8. Assuming, as illustrated, the use of the right-hand pair of lugs 50, water trough 14 has a pair of lugs 53 hingedly connected thereto by bolt means 52, the connection being one which provides for a degree of movement in the trough 14 that permits a pivotal traverse between the storage and use positions thereof already noted as being illustrated in phantom and full line perspective, respectively, in FIG. 1. In the operative position in which trough 14 is used for watering the horses, namely in its horizontally oriented position, it will be noted that advantageous use is made of a laterally extending fender 56 of the trailer 10 to provide support for the trough and simultaneously to limit the pivotal traverse thereof to one which provides said horizontally oriented position to the trough. To make this advantageous use of the fender 56, the position selected for the support platform 18 of the tank 12 is one which correspondingly locates the pivot axis 52 of the trough 14 so that the trough bottom 58 in the horizontally oriented position thereof makes supporting contact against the fender 56, all as is clearly illustrated in FIG. 2.

An appropriate manner of holding trough 14 in its vertically oriented storage position adjacent the tank 12 is to utilize a holding clip 60 attached at one end, as at 62, to strap 44 and adapted at its other end to be hooked onto a loop 64 laterally extending from the trough 14.

As may be readily surmised by progressive examination of FIG. 5 and FIG. 2, it will be observed that previously noted bottom surface 58 of the trough 14 is convexly curved. As a consequence, when trough 14 is pivotted into its vertically oriented position against the tank 12, surface 58 is of an optimum curved configuration to result in a nominal extent of wind resistance when the horse trailer 10 is in transit and is thus being pulled in the direction 66. The streamline design of surface 58 thus significantly minimizes the forces exerted on the trailer wall 16 at the location where the water tank 12 is attached to the support wall. Also assisting in this respect is the cylindrical shape of the housing 34 which bounds the internal storage compartment for the tank 12.

To supply trough 14 with water from the tank 12 both these components are provided with in appropriate fixture between which there is connected in spanning relation a flexible hose 68. The fixture for the trough 14, as best illustrated in FIG. 7, consists simply of a pipe 70 having an opening 72 into the trough 14, while extending ind depending relation from the bottom wall 40 of the tank 12 is a pipe 74 with a petcock-type valve 76. For drainage purposes, trough 14 is also provided with a petcock-type valve 78. In addition, outlet valve 80 for filling buckets or the like for special needs of the horses is advantageously located at the bottom of the tank 12.

Of more important significance than the valves just described, the present invention contemplates the use of a flotation closure member for the opening 72 into the trough 14 to provide level control for the water that is supplied from the tank 12 into the trough 14. More particularly, appropriately mounted for pivotal movement 82 about the pivot axis 90 within the confines of the trough 14 is said flotation closure member, generally designated 84 in FIG. 7. As the name implies, member 84 includes construction material 86 noted for its buoyancy, and also has an elastomeric body 88 at an appropriate location therealong adapted to move into sealing contact over the opening 72 when the water level within the trough 14 reaches a height just below the opening 72 and at said level member 84 consequently is moved in the direction 82, by virtue of the buoyancy of the component 86, so that seal 88 closes off the passageway or opening 72. However, as the horses drink from the trough 14, and thus lower the water level therein, member 84 will of course move in a reverse direction in which seal 88 is in a clearance position with respect to the opening 72 and an additional quantity of water can again flow by gravity from tank 12 into the trough 14. This, of course, will occur until the water level again reaches the previously described shut-off condition.

It should be obvious from the description just provided that the elevated position of tank 12 with respect to the fender 56, which fender is also used as a support for the horizontally oriented position of the trough 14, is one which promotes the gravity flow of water from the storage tank 12 into the trough 14.

It should be readily appreciated that there has been described herein a conbination water tank and trough 12, 14 which is characterized by being attached in a readily facilitated manner to a horse trailer 10 so that the trailer can have a self-contained water supply and all of the numerous and significant advantages resulting therefrom, as already herein previously described. In the within description, a latitude of modification, change and substitution is intended, and in some instances some features of the invention will be employed without a corresponding use of other features. Accordingly, it is appropriate that the appended claims be construed broadly and in a manner consistent with the spirit and scope of the invention herein.

What is claimed is:

1. A water trough attachment for a horse trailer comprising a trailer-attached support bracket having a T-shape in cross-section, a water tank having a cooperating shaped attachment bracket extending rearwardly therefrom adapted to be slidably disposed over said T-shaped support bracket so as to effectively support said water tank on said horse trailer, and a water trough operatively arranged to be supplied with water from said water tank hingedly connected adjacent one side of said water tank so as to be pivotally traversable between a horizontally oriented position during use and a vertically oriented storage position adjacent said water tank, said water trough having a convexly curved bottom to thereby present a correspondingly curved surface with an optimum nominal wind resistance in said storage position thereof when said horse trailer is in transit.

2. An attachable water trough for a horse trailer as claimed in claim 1 wherein said horse trailer has a fender extending laterally thereof, and including a support bracket in an interposed position between said water tank and said fender for supporting said water tank in an elevated position above said fender, said hinge connection of said water trough to said water tank being at a location resulting in said water trough making contact with said fender for support and also effectively limiting the extent of said pivotal traverse thereof so as to provide said horizontally oriented position for said water trough.

3. An attachable water trough for a horse trailer as claimed in claim 2 wherein said operative arrangement for supplying water from said water tank into said horizontally oriented water trough includes a conduit connected from the bottom of said elevated water tank into the top of said water trough, said position of elevation of said water tank relative to said water trough being effective to promote the gravity flow of water through said conduit from said water tank into said water trough.

4. An attachable water trough for a horse trailer as claimed in claim 3 wherein said conduit has an exit opening into said water trough, and including a flotation closure member for said opening movable in response to the water level in said water trough between open and closed positions in relation to said opening, whereby said closure member allows water to flow into said water trough up to a selected level and maintains the quantity of water therein at said level.

* * * * *